United States Patent
Pan

(10) Patent No.: US 9,047,341 B2
(45) Date of Patent: Jun. 2, 2015

(54) METHOD, APPARATUS AND SYSTEM OF INTELLIGENT NAVIGATION

(75) Inventor: Chunxiang Pan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/256,833

(22) PCT Filed: Jan. 21, 2011

(86) PCT No.: PCT/US2011/022131
§ 371 (c)(1),
(2), (4) Date: Sep. 15, 2011

(87) PCT Pub. No.: WO2011/156014
PCT Pub. Date: Dec. 15, 2011

(65) Prior Publication Data
US 2013/0080422 A1    Mar. 28, 2013

(30) Foreign Application Priority Data

Jun. 12, 2010   (CN) .......................... 2010 1 0199106

(51) Int. Cl.
*G06F 17/30*     (2006.01)
*G06Q 30/00*    (2012.01)
*G06Q 30/02*    (2012.01)

(52) U.S. Cl.
CPC .......... *G06F 17/30477* (2013.01); *G06Q 30/00* (2013.01); *G06Q 30/02* (2013.01); *G06F 17/30554* (2013.01)

(58) Field of Classification Search
USPC ................................................ 707/706, 722
See application file for complete search history.

(56) References Cited

U.S. PATENT DOCUMENTS

| | | | |
|---|---|---|---|
| 6,493,702 B1 * | 12/2002 | Adar et al. ..................... | 707/706 |
| 7,080,071 B2 * | 7/2006 | Henrion et al. ............... | 707/713 |
| 7,236,969 B1 * | 6/2007 | Skillen et al. ................. | 707/706 |
| 7,526,458 B2 | 4/2009 | Flinn et al. | |
| 7,606,772 B2 | 10/2009 | Flinn et al. | |
| 7,620,628 B2 | 11/2009 | Kapur et al. | |

(Continued)

FOREIGN PATENT DOCUMENTS

| | | |
|---|---|---|
| JP | 2006040266 A | 2/2006 |
| JP | 2008205820 A | 9/2008 |

(Continued)

OTHER PUBLICATIONS

The PCT Search Report and Written Opinion mailed Mar. 18, 2011 for PCT Application No. PCT/US11/22131, 10 pgs.

(Continued)

*Primary Examiner* — Kim Nguyen
(74) *Attorney, Agent, or Firm* — Lee & Hayes, PLLC

(57) ABSTRACT

The present disclosure describes a method, an apparatus and a system of intelligent navigation. In one embodiment, a method includes: receiving a user inquiry from a client terminal; searching a navigation dictionary based on the user inquiry to obtain a recommendation result corresponding to the user inquiry, the navigation dictionary including an editor recommendation based on user behavior information; and sending the recommendation result to the client terminal. The present disclosure can enhance the accuracy, relevancy, richness and intelligence of the intelligent navigation, and reduce user search time as well as the search loading on the server.

16 Claims, 10 Drawing Sheets

(56) References Cited

U.S. PATENT DOCUMENTS

| | | | |
|---|---|---|---|
| 7,668,885 B2 * | 2/2010 | Wittke et al. | 707/705 |
| 7,685,192 B1 * | 3/2010 | Scofield et al. | 707/709 |
| 7,716,199 B2 * | 5/2010 | Guha | 707/706 |
| 7,937,725 B1 * | 5/2011 | Schaffer et al. | 725/46 |
| 8,108,255 B1 * | 1/2012 | Robinson et al. | 705/14.44 |
| 8,290,828 B2 * | 10/2012 | Stoppelman | 705/26.7 |
| 2007/0078849 A1 | 4/2007 | Slothouber | |
| 2007/0192318 A1 | 8/2007 | Ramer et al. | |
| 2007/0255755 A1 | 11/2007 | Zhang et al. | |
| 2008/0162302 A1 | 7/2008 | Sundaresan et al. | |
| 2009/0164897 A1 | 6/2009 | Amer-Yahia et al. | |
| 2009/0271826 A1 | 10/2009 | Lee et al. | |
| 2009/0313227 A1 | 12/2009 | Dunning et al. | |
| 2010/0094845 A1 | 4/2010 | Moon et al. | |
| 2010/0161400 A1 * | 6/2010 | Snodgrass et al. | 705/14.16 |
| 2010/0281029 A1 | 11/2010 | Parikh et al. | |

FOREIGN PATENT DOCUMENTS

| | | | |
|---|---|---|---|
| JP | 2009043263 A | 2/2009 | |
| JP | 2009104607 A | 5/2009 | |
| JP | 2010056913 A | 3/2010 | |
| JP | 2010224873 A | 10/2010 | |

OTHER PUBLICATIONS

The Chinese Office Action mailed Oct. 25, 2012 for Chinese patent application No. 201010199106.0, a counterpart foreign application of U.S. Appl. No. 13/256,833, 12 pages.

The Chinese Office Action mailed Jun. 9, 2013 for Chinese patent application No. 201010199106.0, a counterpart foreign application of U.S. Appl. No. 13/256,833, 13 pages.

The Chinese Office Action mailed Dec. 3, 2013 for Chinese patent application No. 201010199106.0, a counterpart foreign application of U.S. Appl. No. 13/256,833, 10 pages.

The Extended European Search Report mailed Feb. 27, 2014 for European patent application No. 11792797.0, 3 pages.

Translated Japanese Office Action mailed Jun. 10, 2014 for Japanese patent application No. 2013-514163, a counterpart foreign application of U.S. Appl. No. 13/256,833, 10 pages.

Englis translation of the Chinese Office Action mailed Jun. 12, 2014 for Chinese patent application No. 201010199106.0, a counterpart foreign application of U.S. Appl. No. 13/256,833, 8 pages.

Translated Japanese Office Action mailed Jan. 13, 2015 for Japanese patent application No. 2013-514163, a counterpart foreign application of U.S. Appl. No. 13/256,833, 11 pages.

* cited by examiner

TREASURE STORE

T-SHIRT 🔍 SEARCH

ALL CATEGORIES

RELEVANT TREASURE FOUND:21583147     GO TO T-SHIRT BAR   [📊] TOP

↳

△ WOMEN'S WEAR:   SHORT-SLEEVE T-SHIRT (5992266)   T-SHIRT (8691948)   COTTON T-SHIRT (4649832)
COUPLE'S T-SHIRT (477778)   LARGE/SMALL SIZE(61066)   DRESS (92460)

△ MEN'S WEAR:   SHORT-SLEEVE T-SHIRT (6890544)   LONG-SLEEVE T-SHIRT (730395)   SHORT-SLEEVE POLO(34680)

△ OTHERS:   CHILDREN'S WEAR/CHILDREN'S SHOES/PREGNANT WOMEN'S WEAR (1406111)   SPORTS WEAR (2185548)   OUTDOOR/MOUNTAIN HIKING/CAMPING/TRAVEL
SPORTS/GYM/FANS (122869)   TOY/MODEL/COMICS/GAMES (30302) MEN & WOMEN'S UNDERWEAR (15

∨ SHOW ALL CATEGORIES

FIG. 6

| ALL CATEGORIES | | TRESAURES | STORE | | |
|---|---|---|---|---|---|
| | | MOBILE PHONES | ALL CATEGORIES | ▶ | 🔍 SEARCH |

RELEVANT TRESAURES FOUND: 283897,
RELEVANT PRODUCTS FOUND: 6670

⊙ GO TO MOBILE PHONE BAR  📊 TOP

| BRAND: | NOKIA | SAMSUNG | SONY ERICSSON | LG | MOTOROLA | ⊙ MORE |
| | DOPOD | ALCATEL | LENOVO | K-TOUCH+ | APPLE | OPPO |
| | BLACKBERRY | SHARP | AMOI | BBK | HTC | COOLPAD |

APPEARANCE: CLASSIC    SLIDE    FOLD    ROTATE

PRICE RANGE: <1000    1001-2000    2001-3000    3001-5000    >5000

SMART PHONE? N ← Y

NETWORK: GSM    LENOVO    CDMA    DUEL MODE (GSM/CDMA)    E-SURFING    G3-MOBILE

⌄ MORE

FIG. 7

METHOD, APPARATUS AND SYSTEM OF INTELLIGENT NAVIGATION

CROSS REFERENCE TO RELATED PATENT APPLICATIONS

This application is a national stage application of an international patent application PCT/US11/22131, filed Jan. 21, 2011, which claims priority from Chinese Patent Application No. 201010199106.0, filed Jun. 12, 2010, entitled "Method, Apparatus and System for Smart Navigation," which applications are hereby incorporated in their entirety by reference.

TECHNICAL FIELD

The present disclosure relates to the field of Internet technology and, more specifically, to a method, apparatus and system of intelligent navigation.

BACKGROUND OF THE PRESENT DISCLOSURE

When a user carries out on-line shopping, he/she typically starts from searching for products on e-commerce websites. A user inputs certain keywords corresponding to his/her desires and the returned search result would typically include recommended categories of products and a list of products. In particular, the categories of products may include front-end categories and back-end categories. The front-end categories are for user interface (UI) presentation, while the back-end categories are for management of products. Currently, categorization of products in mainstream systems is generally presented in a tree-like structure in which each parent-category has a plurality of sub-categories, while each sub-category has only one parent-category. Moreover, the scopes of the categories decrease from top of the tree towards the bottom of the tree.

In the e-commerce websites of earlier days, the recommended categories were determined according to the number of products returned in the search result under the keyword used by the user, and were typically shown in hierarchies. However, with the rapid increase in the number of products, when a user inputs certain keywords, the number of categories has increased dramatically and as a result the user may have difficulty in deciding under which category or categories he/she should conduct a refined search. To solve the above problem, one approach is to score the relevance of categories according to past history of user behavior of clicking on the various categories and to present the categories dynamically based on the scores. The relevance of categories typically decreases from left to right and the categories with less relevant may be hidden by category folding. However, the above approach still presents the search results starting from the first-level categories, and consequently the user needs to click many times to screen the results into finer categories. For example, when a user inputs the keyword "T-shirt", the search result may present first-level categories such as "women's wear", "men's wear" and "others." As such, the user needs to click on one of the first-level categories, e.g., "women's wear", in order to view refined categories such as "short-sleeve T-shirt," "couple's T-shirt," "cotton T-shirt," etc.

In order to shorten search time, most e-commerce websites nowadays use intelligent navigation techniques to facilitate a user search. Intelligent navigation employs a bottom-up approach for recommendation, which considers all the factors such as number of clicks, purchases of products of a certain category, and number of products corresponding to the keywords, and provides the categories or features which are most relevant according to a certain recommendation algorithm. When the number of clicks, purchases or products of a certain category, or number of products reaches a given threshold, the bottom-up process is stopped. However, certain drawbacks still exist in the above approach which obtains the recommended categories by calculating data relating to the user. The drawbacks include factors like: noise interference in the data of user behavior and misplacement of one or more categories affecting the accuracy of the recommended categories; the recommended categories being not rich enough when the data of user behavior related to the keyword is small; and the inability to provide recommendation when the number of clicks corresponding to the keyword is lacking.

To solve the aforementioned drawbacks, artificial factors can be added into the recommended categories by intelligent navigation when improving the recommendation algorithm. Conventional techniques mainly implement artificial interference of intelligent navigation by editing the recommended terms. Website operators write the keywords that need to be edited and the recommended categories into a text document in a pre-defined format, integrate the artificial data with the data recommended by the algorithm, and save the integrated data in a server used for the intelligent navigation.

The following problems, however, still exist in the conventional techniques: the artificial interference of intelligent navigation lacks a user-friendly interface; propensity of errors in recommendations due to the recommendations being made based on the experience of website operators without data support; and the artificial interference of intelligent navigation lacking feedback from users and hence the inability to trace the effect of the artificial interference.

SUMMARY OF THE DISCLOSURE

The present disclosure introduces a method and an apparatus of intelligent navigation for enhancing the relevancy, the richness, and the intelligence of intelligent navigation.

In one aspect, a method of intelligent navigation is provided. The method comprises: receiving a user inquiry from a client terminal; searching a navigation dictionary based on the user inquiry to obtain a recommendation result corresponding to the user inquiry, the navigation dictionary including an editor recommendation based on user behavior information; and sending the recommendation result to the client terminal.

In one embodiment, the user inquiry may comprise a search keyword, and the editor recommendation may comprise an index keyword and recommendation content.

In one embodiment, searching the navigation dictionary based on the user inquiry to obtain the recommended result corresponding to user inquiry may comprise: searching for the editor recommendation in the navigation dictionary based on the search keyword; obtaining the recommendation content corresponding to the search keyword; and providing the recommendation content as the recommendation result.

In one embodiment, the user inquiry may comprise a search keyword and a search category, and the editor recommendation may comprise an index keyword, an index category and recommendation content.

In one embodiment, searching the navigation dictionary based on the user inquiry to obtain the recommended result corresponding to user inquiry may comprise: searching for the editor recommendation in the navigation dictionary based on the search keyword and the search category; obtaining the recommendation content corresponding to the search keyword and the search category; and providing the recommendation content as the recommendation result.

In one embodiment, the user inquiry may comprise a search keyword, and the editor recommendation may comprise an index keyword, a recommendation type, and recommendation content.

In one embodiment, searching the navigation dictionary based on the user inquiry to obtain the recommended result corresponding to user inquiry may comprise: searching for the editor recommendation in the navigation dictionary based on the search keyword; obtaining the recommendation type and recommendation content corresponding to the search keyword; and providing the recommendation type and recommendation content as the recommendation result. In one embodiment, after sending the recommendation result to the client terminal, the method may further comprise: displaying the recommendation content on a user interface based on a format according to the recommendation type.

In one embodiment, before searching the navigation dictionary based on the user inquiry, the method may further comprise: obtaining the user behavior information; providing a user behavior log based on the user behavior information; generating reference data based on statistics in the user behavior log; compiling the reference data to obtain the editor recommendation corresponding to the user behavior information; and compiling the editor recommendation into the navigation dictionary.

In one embodiment, the user behavior log may comprise a search log, and the reference data may comprise a keyword, a search category, and search data.

In one embodiment, compiling the reference data to obtain the editor recommendation corresponding to the user behavior information may comprise: when the search data of the reference data is greater than a predetermined search threshold, generating the editor recommendation which includes an index keyword, an index category, and recommendation content based on the reference data, wherein the index keyword comprises a keyword of the reference data, the index category comprises a search category of the reference data, and the recommendation content comprises a category, an attribute, or the category and attribute corresponding to the search data having a greatest value in the reference data.

In one embodiment, the user behavior log may comprise a clicking log, and the reference data may comprise a keyword, a search category, and clicking data.

In one embodiment, compiling the reference data to obtain the editor recommendation corresponding to the user behavior information may comprise: when the clicking data of the reference data is greater than a predetermined clicking threshold, generating the editor recommendation which includes an index keyword, an index category, and recommendation content based on the reference data, wherein the index keyword comprises a keyword of the reference data, the index category comprises a search category of the reference data, and the recommendation content comprises a category, an attribute, or the category and attribute corresponding to the clicking data having a greatest value in the reference data.

In one embodiment, the user behavior log may comprise a purchase log, and the reference data may comprise a keyword, a search category, and purchase data.

In one embodiment, compiling the reference data to obtain the editor recommendation corresponding to the user behavior information may comprise: when the purchase data of the reference data is greater than a predetermined purchase threshold, generating the editor recommendation which includes an index keyword, an index category, and recommendation content based on the reference data, wherein the index keyword comprises a keyword of the reference data, the index category comprises a search category of the reference data, and the recommendation content comprises a category, an attribute, or the category and attribute corresponding to the purchase data having a greatest value in the reference data.

In one embodiment, after compiling the reference data to obtain the editor recommendation corresponding to the user behavior information, the method may further comprise: obtaining user feedback information corresponding to the editor recommendation; determining whether or not the editor recommendation is valid; keeping the editor recommendation if it is determined to be valid; and modifying the editor recommendation if it is determined to be invalid.

In one embodiment, the user feedback information may comprise a number of clicks corresponding to the editor recommendation and a number of clicks of a given category, and when the number of clicks corresponding to the editor recommendation is smaller than the number of clicks of the given category, the editor recommendation information may be determined to be valid.

In another aspect, an intelligent navigation server is provided. The server comprises: an acquisition module that receives a user inquiry from a client terminal; an inquiry module that searches a navigation dictionary based on the user inquiry to obtain a recommendation result corresponding to the user inquiry, the navigation dictionary including an editor recommendation which is obtained based on user behavior; and a transmission module that sends the recommendation result to the client terminal.

In yet another aspect, an intelligent navigation system is provided. The system comprises: a navigation dictionary including an editor recommendation based on user behavior information; a webpage server that receives a user inquiry from a client terminal, sends the user inquiry to an intelligent navigation server, receives a recommendation result from the intelligent navigation server, and sends the recommendation result to the client terminal; and the intelligent navigation server that receives the user inquiry information from the webpage server searches the navigation dictionary based on the user inquiry to obtain the recommendation result corresponding to the user inquiry information, and sends the recommendation result to the webpage server.

In one embodiment, the system may further comprise: a log server that obtains the user behavior information from the webpage server, generates a user behavior log based on the user behavior information, and sends the user behavior log to a storage calculation platform; the storage calculation platform stores the user behavior log, generates reference data based on statistics in the user behavior log, calculates an algorithmic recommendation using an intelligent navigation algorithm, provides the reference data and algorithmic recommendation to a back-end database, integrates the editor recommendation and the algorithmic recommendation to provide integrated data, compiles the integrated data into the navigation dictionary, and imports the navigation dictionary into the intelligent navigation server; and an editing device that edits the reference data, obtains the editor recommendation corresponding to user behavior information, and imports the editor recommendation into the back-end database.

The present disclosure provides a number of advantages. As the recommendation results include the editor recommendation which is obtained based on information relating to the user behavior, the relevancy, richness and intelligence of the intelligent navigation may be enhanced. The negative effects on the recommendation algorithm caused by noise, lack of clicking information and misplacement of products under wrong categories may be minimized and, accordingly, the user shopping experience may be improved. As the recommendation data is provided by analyzing user behavior information and checking the number of products, coupled with the ability to track the effect of the edited navigation data, the accuracy, relevancy, richness and intelligence of the recommendation results are guaranteed. Accordingly, user search time decreases, and search loading on the servers is reduced. Of course, any product implementing an embodiment of the present disclosure needs not to possess all the aforementioned advantages at the same time.

BRIEF DESCRIPTION OF THE DRAWINGS

FIG. 6 is a diagram of parent-categories and sub-categories shown in the user interface of a client terminal in accordance with the second embodiment of the present disclosure.

FIG. 7 is a diagram of attributes shown in the user interface of a client terminal in accordance with the second embodiment of the present disclosure.

DETAILED DESCRIPTION

The following is a clear and complete description of embodiments with reference to the figures. It shall be understood that the disclosed embodiments constitute merely some, but not all, of the exemplary implementations of the proposed technique. Any variations or modifications of the disclosed embodiments by one with ordinary skill in the art are still within the scope of protection the present disclosure is entitled to.

Figure 1:
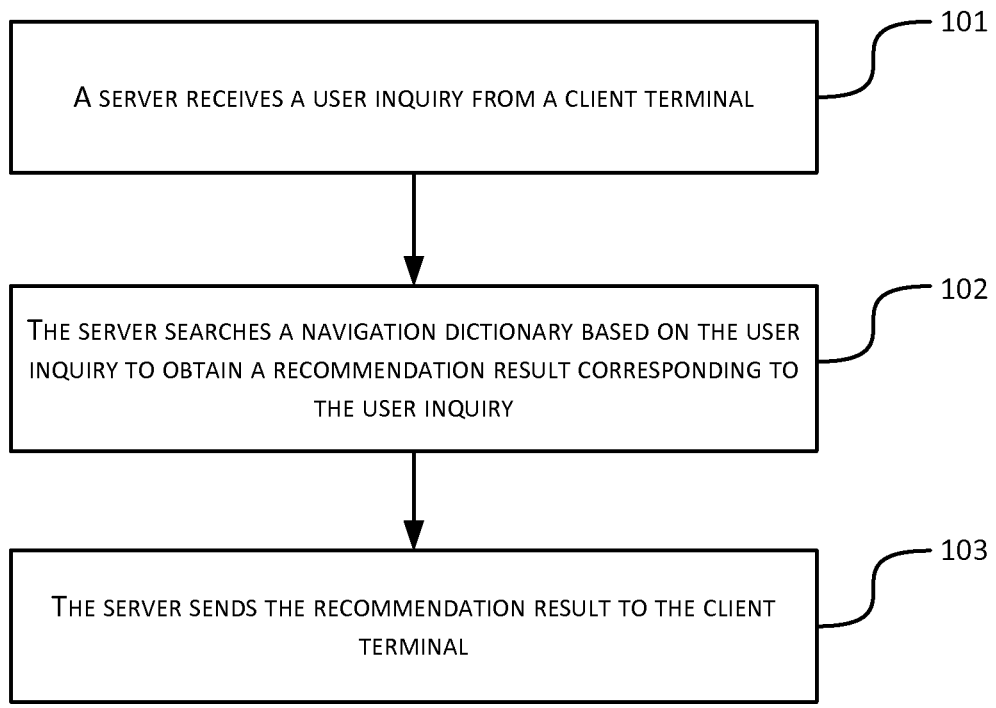
FIG. 1 is a flowchart of a method of intelligent navigation in accordance with a first embodiment of the present disclosure.

FIG. 1 illustrates a flowchart of a method of intelligent navigation in accordance with an embodiment of the present disclosure. The method includes a number of operations as described below.

At 101, a server receives a user inquiry from a client terminal.

The user inquiry may include one or more inquiry keywords, and may further include one or more inquiry categories.

At 102, the server searches a navigation dictionary based on the user inquiry to obtain one or more recommendation results corresponding to the user inquiry.

The navigation dictionary includes information relating to one or more recommendations by the editor corresponding to user behavior information.

Before searching the navigation dictionary based on the user inquiry, information relating to the user behavior may be obtained and stored in a user behavior log. In one embodiment, information relating to the user behavior may include inquiry keywords inputted by the user in a search box, products and their categories and attributes that were clicked on by the user after conducting a search based on the inquiry keywords, products purchased by the user and their categories and attributes, and recommended categories and all sub-categories clicked on by the user after conducting a search based on the inquiry keywords. Correspondingly, the user behavior log may include a search log, a product clicking log, a purchase log and a navigation area clicking log.

When the user clicks on a search button after entering one or more inquiry keyword in a search box, a log server generates a search record. The text form of the search record forms the search log, which is used to describe the categories when the user conducts the keyword search.

When the user clicks on a product on a search result page, the log server generates a product clicking record. The text form of the product clicking record forms the product clicking log, which is used to describe the product clicked on by the user after conducting the keyword search as well as information relating to and attributes of the product.

When the user purchases a certain product, the log server generates a purchase record. The text form of the purchase record forms the purchase log, which is used to describe the user purchase of a certain product.

When the user clicks on a certain recommended category or one category of all categories after searching, the log server generates an intelligent navigation clicking record or an all-category clicking record the respective text form of which forms the navigation area clicking log.

After generating the user behavior log, statistics, or reference data, may be generated based on information recorded in the user behavior log. In one embodiment, the reference data may include the user search record, the product clicking record, the navigation area clicking record, the purchase record and the information relating to the category tree of products. The statistics of the distribution of the search category, clicked product categories and purchases corresponding to each inquiry keyword may be generated regularly, and distribution statistics may be shown according to the hierarchy of a category tree.

In one embodiment, the keywords recorded in the search log may be normalized (including, for example, conversion between capital and small cases, full/half-width conversion for entry of Chinese characters, punctuation conversion, conversion of traditional/simplified Chinese character fonts, etc.), and the statistics of the search page view (PV) and search user view (UV) of each keyword in different categories may be gathered. The keywords recorded in the product clicking log may be normalized, and the statistics of the clicking PV and the clicking UV of each keyword in different categories may be generated. The statistics of the purchase log may be generated to calculate transaction UV, the number of transactions and the monetary amount of transactions of each keyword in different categories. Then, the combination "keyword+search category" may be used as a key to intersect the data derived from processing the search log, the product clicking log and the purchase log, and to obtain reference data in the form of "keyword+search category+search PV+search UV+clicking PV+clicking UV+transaction UV+number of transactions+monetary amount of transactions", or in a similar format, as shown in Table 1.

TABLE 1

Format of Reference Data

| Keyword | Search Category | Search PV | Search UV | Clicking PV | Clicking UV | Transaction UV | Number of Transactions | Monetary Amount of Transactions |
|---|---|---|---|---|---|---|---|---|
| | | | | | | | | |

After obtaining the reference data, information relating to editor recommendations corresponding to information relating to the user behavior may be obtained by compiling the reference data.

When the user behavior log corresponding to information relating to the user behavior is the search log, the reference data may include keywords, search categories and search data, and the search data may be the search PV and/or the search UV. When the value of the search data included in the reference data is greater than a predetermined search threshold, each or at least one editor recommendation including one or more index keywords, one or more index categories and recommendation content may be generated based on the reference data. In particular, the one or more index keywords may be the keywords of the reference data, the one or more index categories may be the search categories of the reference data, and the content of the recommendations may be the categories and/or attributes corresponding to the search data of the reference data having the largest value (the value of the search PV and/or search UV being the greatest). The search threshold may be a value set by the system, or may be modified based on actual conditions.

When the user behavior log corresponding to information relating to the user behavior is the clicking log, the reference data may include keywords, search categories and clicking data, and the clicking data may be the clicking PV and/or the clicking UV. When the value of the clicking data included in the reference data is greater than a predetermined clicking threshold, editor recommendation including one or more index keywords, one or more index categories and content of the recommendations may be generated based on the reference data. In particular, the one or more index keywords may be the keywords of the reference data, the one or more index categories may be the search categories of the reference data, and the content of the recommendations may be the categories and/or attributes corresponding to the clicking data of the reference data having the largest value. The clicking threshold may be a value set by the system, or may be modified based on actual conditions.

When the user behavior log corresponding to information relating to the user behavior is the purchase log, the reference data may include keywords, search categories and purchase data, and the purchase data may be the transaction UV, the number of transactions and/or the monetary amount of transactions. When the value of the purchase data of the reference data is greater than a predetermined purchase threshold, editor recommendation including one or more index keywords, one or more index categories and content of the recommendations may be generated based on the reference data. The one or more index keywords may be the keywords of the reference data, the one or more index categories may be the search categories of the reference data, and the content of the recommendations may be the categories and/or attributes corresponding to the purchase data of the reference data having the largest value. The purchase threshold may be a value set by the system, or may be modified based on actual conditions.

In one embodiment, after obtaining the editor recommendations, the editor recommendations may be compiled into the navigation dictionary. Alternatively, the obtained editor recommendations may be integrated with the algorithmic recommendation, which is computed by the current intelligent navigation algorithm, and the integrated data may be compiled into the navigation dictionary. If the editor recommendation and the algorithmic recommendation are identical, only one of them is kept; otherwise, both of them are kept.

In another embodiment, after obtaining the editor recommendation, information relating to user feedback corresponding to the editor recommendation may be obtained and used to determine whether the editor recommendation is valid. If the editor recommendation is valid, it will be kept; otherwise, it will be modified. Since the editor recommendation is compiled into the navigation dictionary as the category and/or attribute having the largest number of clicks, it will be modified accordingly if the number of clicks of the editor recommendation does not meet a certain requirement. In one embodiment, information relating to user feedback may include the number of clicks corresponding to the editor recommendation and the number of clicks of each category. When the number of clicks corresponding to the editor recommendation is less than the number of clicks of a certain category, e.g., indicating the category of the editor recommendation is not the category having the largest number of clicks, the editor recommendation is deemed to be invalid.

When searching the navigation dictionary based on the user inquiry, the editor recommendation may include index keywords and content of the recommendation corresponding to the index keywords if the user inquiry includes search keywords. The content of the recommendation may include recommended categories and/or recommended attributes. Table 2 shows an example of editor recommendation.

TABLE 2

| Index Keywords | Recommendation content |
|---|---|
| T-shirt | Women's long-sleeve T-shirt; Women's short-sleeve T-shirt; Men's long-sleeve T-shirt; Men's short-sleeve T-shirt; Children's T-shirt; sports T-shirt; couple's T-shirt |
| ... | ... |

During the search of the navigation dictionary, matching between the search keywords and the index keywords of the navigation dictionary may be performed, and the editor recommendation corresponding to each matched index keyword may be obtained and used as the resultant recommendation. The editor recommendation tends to have more relevance and accuracy as it is obtained based on the statistics of a large amount of user behavior information. Accordingly, by searching the navigation dictionary to obtain recommendations, the relevancy and accuracy of the recommendations may be effectively enhanced and the number of user inquiries may be reduced, thereby lessening the loading on the servers.

In the event that the user inquiry includes search keywords and search categories, the editor recommendation may include index keywords, index categories and recommendation content corresponding to the index keywords and index categories. The recommendation content may include recommended categories and/or recommended attributes. The editor recommendation including index keywords, index categories and recommendation content are shown in Table 3.

TABLE 3

| Index Keywords | Index Categories | Recommendation content |
|---|---|---|
| T-shirt | Root category | Women's long-sleeve T-shirt; Women's short-sleeve T-shirt; Men's long-sleeve T-shirt; Men's short-sleeve T-shirt; Children's T-shirt; sports T-shirt; couple's T-shirt |
| ... | ... | ... |

During the search of the navigation dictionary, editor recommendation, the index keyword to which the search keyword matches and the index category to which the search category matches, may be obtained as a result of matching the search keyword with the index keywords of the navigation dictionary as well as matching the search category with the index categories of the navigation dictionary. As the editor recommendation includes the index categories, the user may obtain different recommendation results under different search categories and hence the relevancy and richness of the recommendation results may be enhanced. Additionally, the editor recommendation may include recommendation types. A recommendation type is used to determine the format of the recommendation content and may be represented by a recommendation type field. For example, the value "1" of the recommendation type field means to return the category and the attribute, the value "2" means to return the category only and the value "3" means to return the attribute only. A person ordinarily skilled in the art may further set other recommendation types based on the editor recommendation.

At 103, the server sends the one or more recommendation results to the client terminal.

In one embodiment, after sending the recommendation results to the client terminal, the recommendation content in the recommended results may be displayed on a use interface device based on the format of the recommendation type of the recommendation results in the event that the editor recommendation includes index keyword, recommendation type and the recommendation content.

The present disclosure has a number of advantages. As the recommendation results include the editor recommendation that is obtained based on information relating to the user behavior, the relevancy, richness and intelligence of the intelligent navigation may be enhanced. The negative effects on the recommendation algorithm caused by noise, lack of clicking information, and misplacement of products under wrong categories may be minimized and, accordingly, the user shopping experience may be improved. As the recommendation data is provided by analyzing user behavior information and checking the number of products, coupled with the ability to track the effect of the edited navigation data, the accuracy, relevancy, richness and intelligence of the recommendation results are guaranteed. Accordingly, user search time decreases, and search loading on the servers is reduced. Of course, any product implementing an embodiment of the present disclosure needs not to possess all the aforementioned advantages at the same time.

Figure 2:
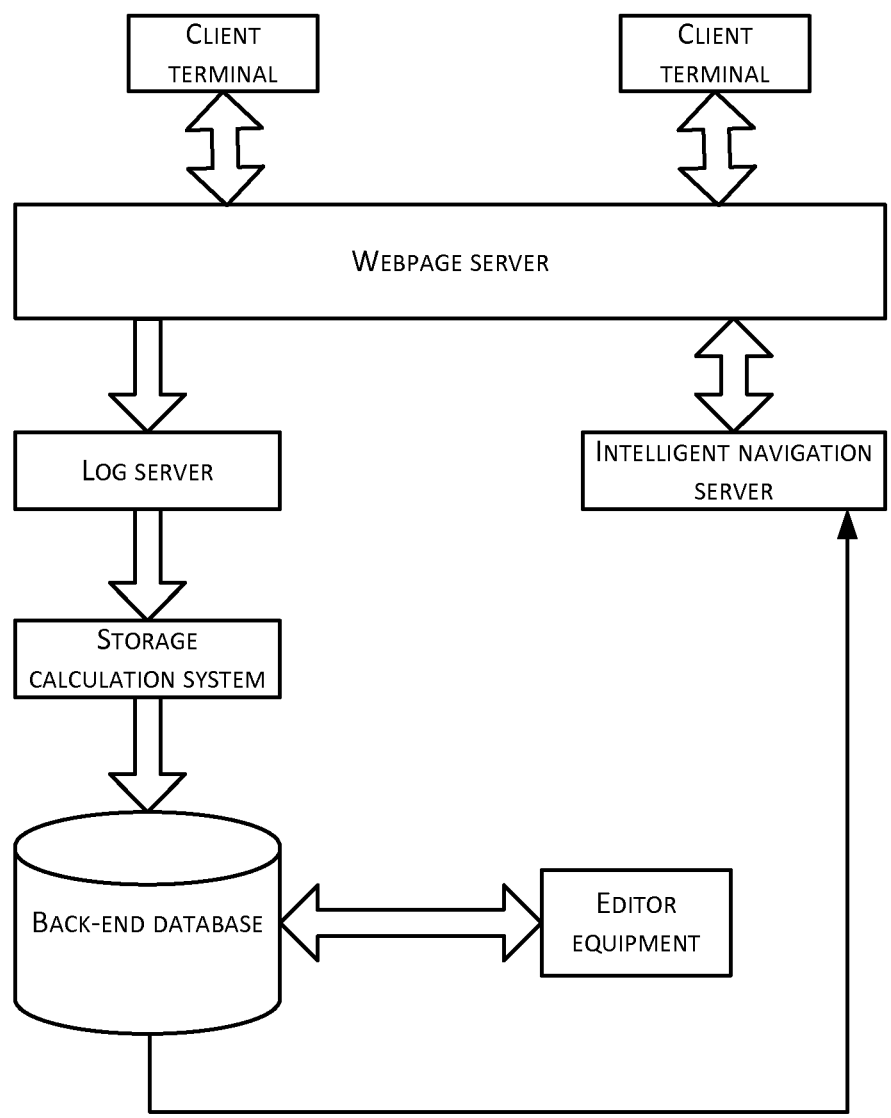
FIG. 2 is a diagram of a system of intelligent navigation in accordance with a second embodiment of the present disclosure.

The method of intelligent navigation of the present disclosure may be implemented in a system the structure of which is shown in FIG. 2. The system includes a client terminal, a webpage server, a log server, a storage calculation system, a back-end database, editing device and an intelligent navigation server. The client terminal sends user inquiries to the webpage server to obtain recommendations from the webpage server. The webpage server obtains recommendations from the intelligent navigation server and returns the recommendations to the client terminal. The log server obtains user behavior information from the webpage server and generates the user behavior log, which includes user inquiries and a record of product clicks. The storage calculation system may be a system of distributed file storage and calculation that stores the user behavior log, generates the algorithmic recommendation using the intelligent navigation algorithm, and computes the statistics of the reference data for the editing device. The back-end database stores the algorithmic recommendation and the reference data. The editing device edits the obtained editor recommendation information, displays the editor recommendations and the reference data, and provides an interface for modifying the editor recommendations.

A detailed description of the method of intelligent navigation will be given in conjunction with the above scenarios.

Figure 3:
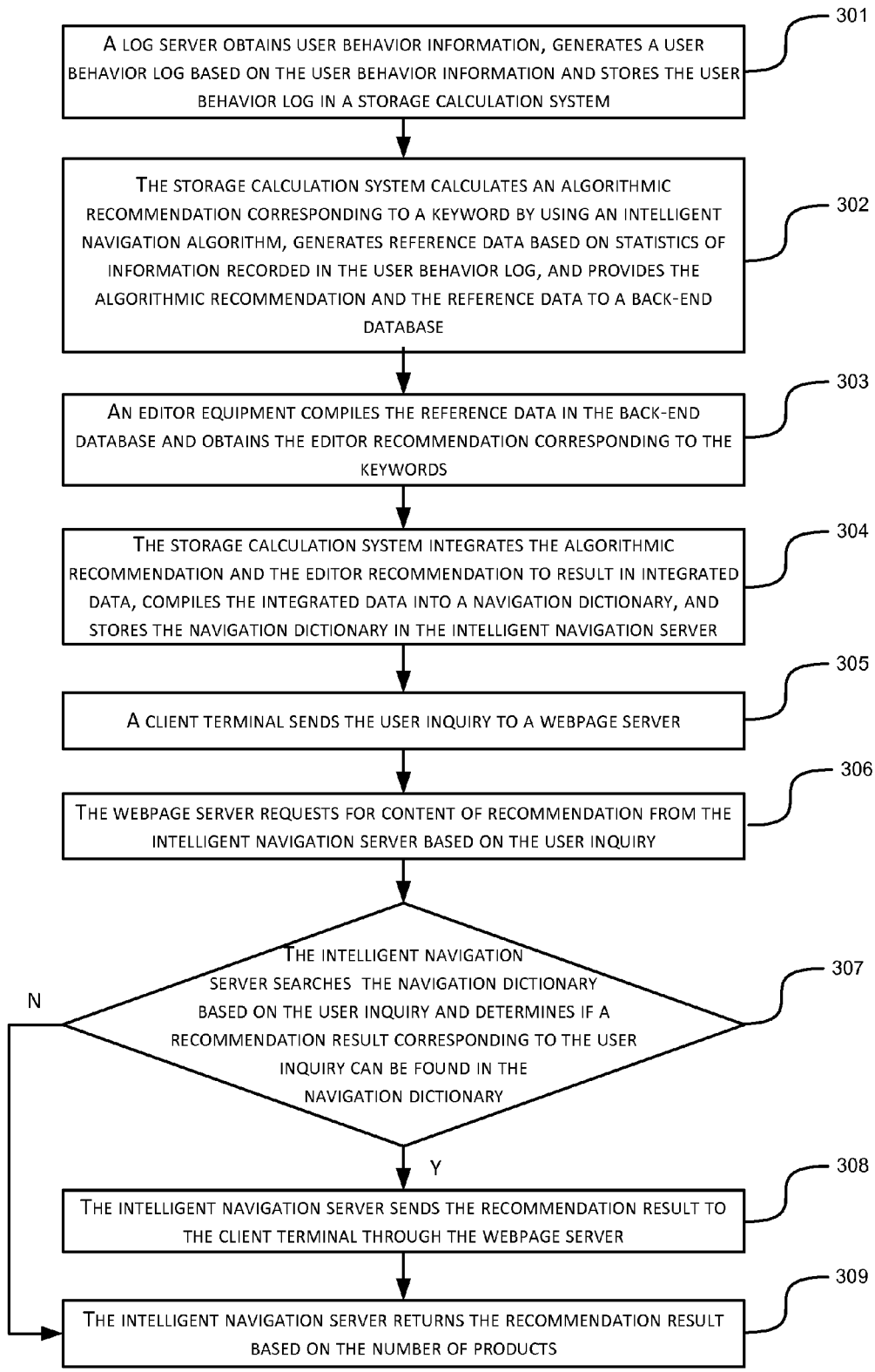
FIG. 3 is a flowchart of a method of intelligent navigation in accordance with the second embodiment of the present disclosure.

FIG. 3 is a flowchart of a method of intelligent navigation in accordance with another embodiment of the present disclosure. The method includes a number of operations as described below.

At 301, a log server obtains user behavior information from a webpage server, generates a user behavior log based on the user behavior information, and stores the user behavior log in a storage calculation system.

In one embodiment, the log server generates records in different formats based on the different behaviors of one or more users, and stores the records in the storage calculation system in text form. The text form of the records forms the user behavior log, and the storage calculation system may be a distributed storage calculation system.

The user behavior log may include a search log, a product clicking log, a purchase log and a navigation area clicking log. The search log may include the times of search, the user-entered keywords and the categories under which searches were conducted. The product clicking log may include the times of clicks, the user-entered keywords, the products clicked on by one or more users after searching, and the category and attributes of each product. The purchase log may include the times of purchase, the user-entered keywords for searches, the products purchased by one or more users after searching, and the category and attributes of each product. The navigation area clicking log may include the times of clicks in the navigation area, the user-entered keywords for searches, and the categories clicked on by one or more users in the recommended categories after searching.

At 302, the storage calculation system calculates an algorithmic recommendation corresponding to a keyword by using an intelligent navigation algorithm, generates reference data based on statistics of information recorded in the user behavior log, and provides the algorithmic recommendation and the reference data to a back-end database.

In one embodiment, after the log server provides the user behavior log to the storage calculation system, from time to time the storage calculation system may periodically calculate a respective algorithmic recommendation corresponding to each keyword. Each keyword may be used as the preset input of the algorithm for calculation by the algorithm. Accordingly, the corresponding algorithmic recommendation may be obtained. The algorithmic recommendation may include algorithmic recommended categories and/or algorithmic recommended attributes.

In another embodiment, the reference data generated by the storage calculation system may include a user inquiry record, a product clicking record, a navigation area clicking record, a purchase record and information of a category tree of products. The storage calculation system may periodically gather the statistics of the distribution of search categories corresponding to each keyword, the distribution of categories of product clicks, and the distribution of purchases based on the user behavior log, and then present the distributions in a hierarchical structure of a category tree. In one embodiment, the storage calculation system may normalize the keywords recorded in the search log (including, for example, conversion between capital and small cases, full/half-width conversion for entry of Chinese characters, punctuation conversion, conversion of traditional/simplified Chinese character fonts, etc.), and the statistics of the search page view (PV) and search user view (UV) of each keyword in different categories may be gathered. The keywords recorded in the product clicking log may be normalized, and the statistics of the clicking PV and the clicking UV of each keyword in different categories may be gathered. The statistics of the purchase log may be gathered by calculating the transaction UV, the number of transactions and the monetary amount of transactions of each keyword in different categories. Then, the storage calculation may intersect the above data obtained by using the combination "keyword+search category" as a key to process the search log, the product clicking log and the purchase log to obtain reference data in the form of "keyword+search category+search PV+search UV+clicking PV+clicking UV+transaction UV+number of transactions+monetary amount of transactions" or in a similar format.

Figure 4:
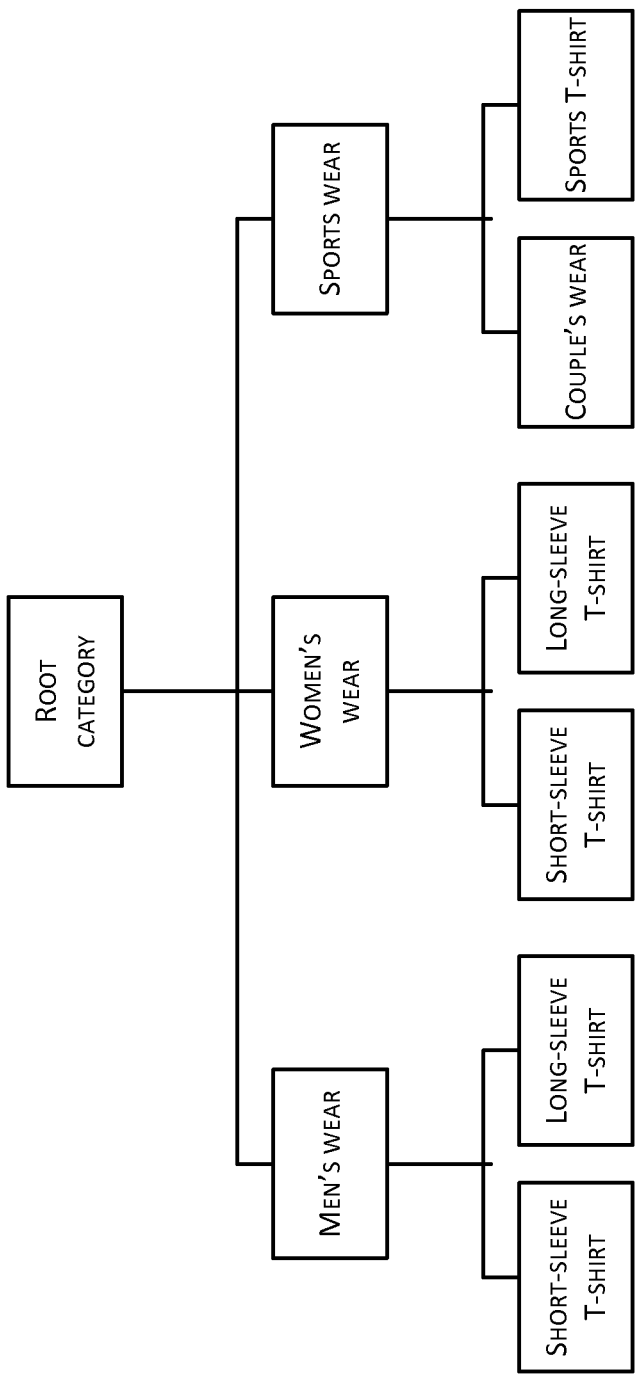
FIG. 4 is a diagram of a category tree of products in accordance with the second embodiment of the present disclosure.

As certain structural relationship exists among the search categories, the search categories corresponding to a given keyword may be included in the tree nodes or a similar structure. For example, if the keyword is "T-shirt", the corresponding search categories may be included in the tree nodes of the category tree of products as shown in FIG. 4.

The storage calculation system may periodically calculate and present information relating to user feedback corresponding to "keyword+search category". The information relating to user feedback may include the distribution of clicks of recommended categories and the distribution of clicks of all categories. Specifically, the storage calculation system may provide the statistics of the clicks of recommended categories corresponding to "keyword+search category" based on the clicking log of the navigation area, calculate the categorical clicks of all categories, and combine the reference data to generate the user feedback information, as shown in Table 4.

TABLE 4

| Keywords | Search Categories | Recommended Categories | Click 1 |
|---|---|---|---|
| | | Category 1 of all categories | Click 2 |
| | | Category 2 of all categories | Click 3 |
| | | ... | ... |
| | | Category n of all categories | Click n + 1 |

In another embodiment, the storage calculation system may periodically provide high high-PV keywords to the back-end database and maintain the high-PV keyword status. The status is indicative of whether the high-PV keywords have been edited and still time-effective.

At 303, an editing device compiles the reference data in the back-end database and obtains the editor recommendation corresponding to the keywords.

In the editing environment of the editing device, imported keyword labels and managed keyword labels are presented. The imported keyword labels import a list of keywords in a text document into an editing page. The managed keyword labels may be used to manage the pages to display a summary of keywords and have filtering function (for example, only keywords of certain status may be displayed). After entering the editing page by choosing a keyword, a display of the algorithmic recommendation provided by the intelligent navigation, the distribution of search categories and the distribution of clicking categories, etc. may be provided.

The editing page may provide the editing and checking functions. The editing function may include modification of the title of the algorithmic recommendation information to obtain the editor recommendation, and adding the recommended categories and recommended attributes corresponding to keywords for the editor recommendation. For example, when the algorithmic recommendation is "T-shirt+couple's wear" and the keyword is "T-shirt", the algorithmic recommendation may be modified as "T-shirt+couple's T-shirt", and the recommended category "sports T-shirt" corresponding to the keyword "T-shirt" may also be added. The checking function may include preview of the online display of the editor recommendation when editing the pages in order to compare different editor recommendations. For example, when the editor recommendation includes "T-shirt+couple's T-shirt" and "T-shirt+sports T-shirt", the online display of the two pieces of editor recommendation may be previewed, so as to compare the two pieces of editor recommendation for determination of whether to keep the two pieces of editor recommendation.

The editing device further provides the distribution of search categories, the distribution of clicking categories and the status of transactions under all categories for determining the recommended categories and whether to edit and provide data on the downward path of categories. The editing page may dynamically present the number of products of each search category to avoid leading the user to categories having a very small number of products. The editing device may check the distribution of clicks of keywords in the navigation area and in all categories during a pre-determined period of time based on the reference data, obtain edited user feedback, and provide the basis for determining editing rules.

At 304, the storage calculation system integrates the algorithmic recommendation and the editor recommendation to result in integrated data, compiles the integrated data into the navigation dictionary, and stores the navigation dictionary in an intelligent navigation server.

The editor recommendation may be compiled in the format of "index keywords+index categories+recommendation type+recommendation content." An example of the editor recommendation is shown as Table 5.

TABLE 5

| Index Keywords | Index Categories | Recommendation Type | Recommendation content |
|---|---|---|---|
| T-shirt | Root category | 1 | Women's long-sleeve T-shirt; Women's short-sleeve T-shirt; Men's long-sleeve T-shirt; Men's short-sleeve T-shirt; |

TABLE 5-continued

| Index Keywords | Index Categories | Recommendation Type | Recommendation content |
|---|---|---|---|
| | | | Children's T-shirt; sports T-shirt; couple's T-shirt |
| ... | ... | ... | ... |

In one embodiment, the recommendation content is used for determining the recommended categories and/or recommended attributes shown on a user interface. The recommendation type is used for determining the format of the recommendation content. The recommendation type may include "category+feature", "category" and "feature", etc., and different recommendation types may be represented by different notations, such as numbers 1, 2 and 3 which indicate different recommendation types. Based on the above data structure, a key-value inquiry mechanism, in which the "key" is "index keyword+index category" and the "value" is "recommendation type+recommendation content" or "recommended category", may be established for the navigation dictionary.

The index words may be time-sensitive keywords. The recommendation content corresponding to time-sensitive keywords is time-sensitive and is relevant to time, such as seasons, dates, etc. For example, if the time-sensitive keyword is "T-shirt", its corresponding recommendation content "short-sleeve T-shirt" is time-sensitive as it has a larger number of clicks in summer than in winter. When the recommendation content corresponding to the time-sensitive keywords has an amount of clicks less than a pre-determined threshold value, or the recommendation content is not the category or attribute having the largest number of clicks, the recommendation content is deemed to be invalid. The editing device may periodically provide reminder to review the recommendation content corresponding to time-sensitive keywords, in order for a system operator to determine whether the recommendation content is invalid to edit the recommendation content regularly when the recommendation content is invalid.

In another embodiment, when the recommendation content does not meet user requirements, in other words, the number of clicks is smaller than the pre-determined threshold or it is not the category or attribute having the largest number of clicks, the editing device may provide reminder to re-edit the recommendation content. Specifically, in the user feedback information as shown in FIG. 2, if a certain category has a number of clicks larger than one of the recommended categories, the system operator may be reminded to check whether the number of clicks of that category is fraudulent data. If the number of clicks of that category is not fraudulent data, it is determined that the current recommendation categories cannot meet the requirements and that proper modifications to the recommendation categories are necessary. For example, a category corresponding to a given index keyword but having the largest number of clicks may be used to replace the current recommendation content, or the editor recommendation corresponding to the recommendation categories may be deleted from the navigation dictionary.

At 305, a client terminal sends a user inquiry to the webpage server.

The user inquiry may include search keywords and search categories. The search categories may include the root category by default, and may be determined as a certain tree node in the category tree of products as shown in FIG. 4 based on user choice.

At 306, the webpage server requests for recommendation content from the intelligent navigation server based on the user inquiry.

At 307, the intelligent navigation server searches the navigation dictionary based on the user inquiry. If a recommendation result corresponding to the user inquiry is found in the navigation dictionary, the method proceeds to operation 308; otherwise the method proceeds to operation 309.

At 308, the intelligent navigation server sends the requested recommendation result to the client terminal through the webpage server.

In one embodiment, if the intelligent navigation server uses the search keyword and the search category as the "key" and finds the corresponding "value" in the navigation dictionary, the intelligent navigation server may return the recommendation content in the "value" as the recommendation result to the webpage server. The webpage server sends the recommendation result to the client terminal client terminal where the recommendation result is presented to the user.

Figure 5:
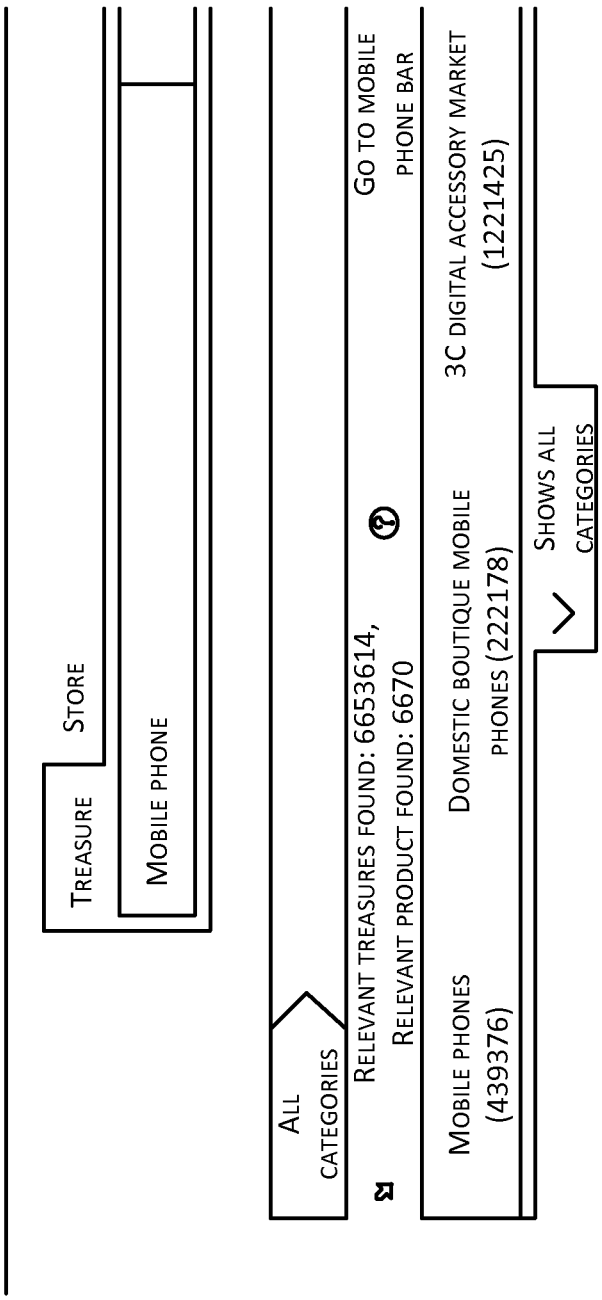
FIG. 5 is a diagram of categories shown in a user interface of a client terminal in accordance with the second embodiment of the present disclosure.

For example, when the user enters the keywords "mobile phone" in the root category through the client terminal and conducts a category search, the intelligent navigation server returns the recommendation result through the webpage server and presents the result on the user interface of the client terminal, as shown in FIG. 5. In the depicted example, the recommendation result includes "mobile phone (439376)", "domestic boutique mobile phone (222178)" and "3C digital accessory market (1221425)", which are the recommended categories.

In another embodiment, the recommended result presented on the client terminal may be in the form of a parent-sub category, as shown in FIG. 6. When the user enters the keyword "T-shirt" in the root category through the client terminal and conducts a category search, the recommendation result is presented as three separate parent-categories, namely "women's wear", "men's wear" and "others", and each of the parent-categories may include a number of sub-categories.

In an alternative embodiment, the recommendation result presented on the client terminal may be the recommended attribute, as shown in FIG. 7. When the user enters the keywords "mobile phone" in the root category through the client terminal and conducts a category search, the recommendation result is presented based on the attributes of "brands", "appearances", "price ranges", "smart phone" and "networks".

At 309, the intelligent navigation server returns the recommendation result based on the number of products.

In one embodiment, if the intelligent navigation server uses the search keyword and the search category as the "key" and does not find any corresponding "value" in the navigation dictionary, the intelligent navigation server may return the recommendation content based on keywords of the titles of online products and the number of products.

For example, when the user enters the keyword "plate" in the root category through the client terminal and conducts a category search, and the intelligent navigation server does not find any corresponding recommendation, it presents the top ten categories that have the largest number of products based on the keywords of the title of online products and displays the number of products corresponding to each category.

The present disclosure provides a number of advantages. As the recommendation results include the editor recommendation which is obtained based on information relating to the user behavior, the relevancy, richness and intelligence of the intelligent navigation may be enhanced. The negative effects on the recommendation algorithm caused by noise, lack of clicking information and misplacement of products under wrong categories may be minimized and, accordingly, the user shopping experience may be improved. As the recommendation data is provided by analyzing user behavior information and checking the number of products, coupled with the ability to track the effect of the edited navigation data, the accuracy, relevancy, richness and intelligence of the recommendation results are guaranteed. Accordingly, user search time decreases, and search loading on the servers is reduced. Of course, any product implementing an embodiment of the present disclosure needs not to possess all the aforementioned advantages at the same time.

The embodiments of the present disclosure provide a method of intelligent navigation and certain implementation scenarios. Correspondingly, the present disclosure also provides an apparatus and a system using the aforementioned method, described below.

Figure 8:
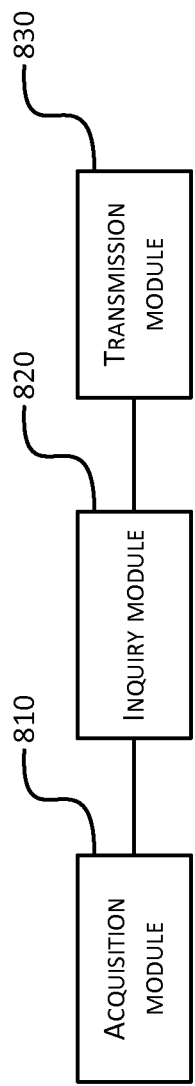
FIG. 8 is a block diagram of an intelligent navigation server in accordance with a third embodiment of the present disclosure.

FIG. 8 illustrates a block diagram of an intelligent navigation server in accordance with an embodiment of the present disclosure. The intelligent navigation server includes a number of components as described below.

An acquisition module 810 is used for receiving user inquiries from a client terminal.

An inquiry module 820 is used for searching a navigation dictionary based on the user inquiries received by the acquisition module 810 and for obtaining recommendation results corresponding to the user inquiries. The navigation dictionary includes editor recommendations based on user behavior.

A user inquiry may include one or more search keywords. The editor recommendation may include one or more index keywords and content of the recommendation. The inquiry module 820 searches for the editor recommendation in the navigation dictionary based on the one or more search keywords, obtains the search categories and content of the recommendation corresponding to the one or more search keywords, and provides the content of the recommendation as the recommended result.

The user inquiry may further include one or more search keywords and search categories. The editor recommendation may include one or more index keywords, one or more index categories and recommendation content. The inquiry module 820 searches for the editor recommendation in the navigation dictionary based on the one or more search keywords and search categories, obtains the recommendation content corresponding to the one or more search keywords and search categories, and provides the content of the recommendation as the recommended result.

The user inquiry may further include one or more search keywords. The editor recommendation may include one or more index keywords, recommendation types and recommendation content. The inquiry module 820 searches for the editor recommendation in the navigation dictionary based on the one or more search keywords and search categories, obtains the recommendation content corresponding to the one or more search keywords and search categories, and provides the recommendation types and the content of the recommendation as the recommended result.

A transmission module 830 is used for sending the recommendation result, obtained by the inquiry module 820, to the client terminal.

The present disclosure provides a number of advantages. As the recommendation results include the editor recommendation which is obtained based on information relating to the user behavior, the relevancy, richness and intelligence of the intelligent navigation may be enhanced. The negative effects on the recommendation algorithm caused by noise, lack of clicking information and misplacement of products under wrong categories may be minimized and, accordingly, the user shopping experience may be improved. As the recommendation data is provided by analyzing user behavior information and checking the number of products, coupled with the ability to track the effect of the edited navigation data, the accuracy, relevancy, richness and intelligence of the recommendation results are guaranteed. Accordingly, user search time decreases, and search loading on the servers is reduced. Of course, any product implementing an embodiment of the present disclosure needs not to possess all the aforementioned advantages at the same time.

Figure 9:
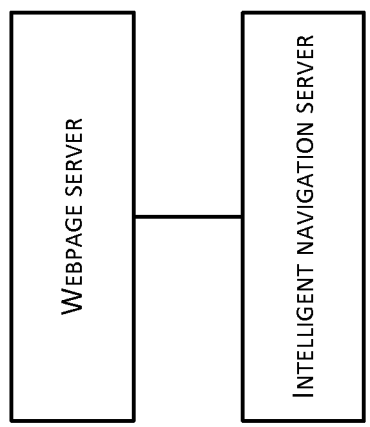
FIG. 9 is a block diagram of an intelligent navigation in accordance with a fourth embodiment of the present disclosure.

FIG. 9 illustrates a block diagram of a system of intelligent navigation in accordance with another embodiment of the present disclosure. The system includes a number of components as described below.

A webpage server is used for receiving user inquiries from a client terminal, sending the user inquiries to an intelligent navigation server, receiving recommendation result returned from the intelligent navigation server, and sending the recommendation result to the client terminal.

The intelligent navigation server is used for receiving the user inquiries from the webpage server, searching a navigation dictionary based on the user inquiries, obtaining recommendation results corresponding to the user inquiries, and sending the recommendation results to the webpage server. The navigation dictionary includes editor recommendation based on user behavior.

A user inquiry may include one or more search keywords. The editor recommendation may include one or more index keywords and content of the recommendation. The intelligent navigation server searches for the editor recommendation in the navigation dictionary based on the one or more search keywords, obtains the recommendation content corresponding to the one or more search keywords, and provides the content of the recommendation as the recommendation result.

The user inquiry may further include one or more search keywords and search categories. The editor recommendation may include one or more index keywords, one or more index categories and recommendation content. The intelligent navigation server searches for the editor recommendation in the navigation dictionary based on the one or more search keywords and search categories, obtains the recommendation content corresponding to the one or more search keywords and search categories, and provides the content of the recommendation as the recommended result.

The user inquiry may further include one or more search keywords. The editor recommendation may include one or more index keywords, recommendation types and recommendation content. The intelligent navigation server searches for the editor recommendation in the navigation dictionary based on the one or more search keywords, obtains the recommendation types and the recommendation content corresponding to the one or more search keywords, and provides the content of the recommendation as the recommended result.

Figure 10:
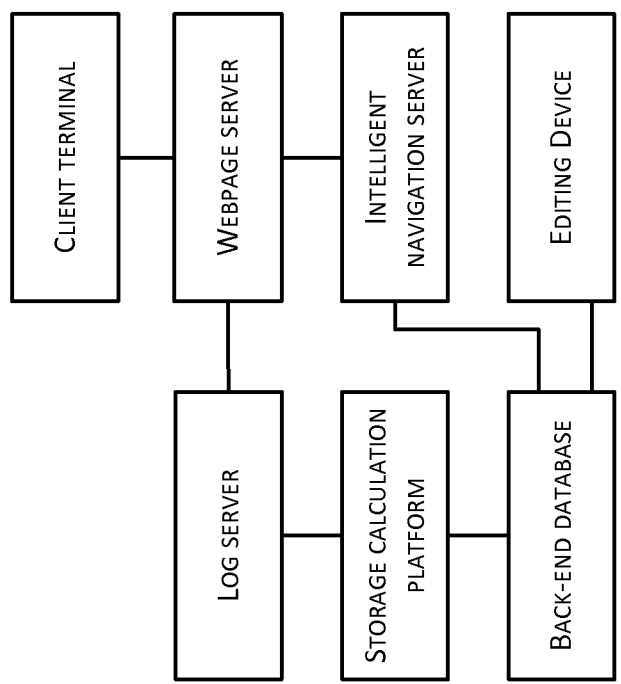
FIG. 10 is a block diagram of another intelligent navigation in accordance with the fourth embodiment of the present disclosure.

Further, as shown in FIG. 10, the system may also include a number of additional components as described below.

A client terminal is used for receiving the recommendation result from the webpage server and displaying the recommendation result on a user interface based on the format which is determined by a recommendation type in the recommendation result.

A log server is used for obtaining user behavior information from the webpage server, generating a user behavior log based on the information relating to the user behavior, and sending the user behavior log to a storage calculation platform.

The storage calculation platform is used for storing the user behavior log, gathering statistics of reference data based on the user behavior log, calculating and obtaining algorithmic recommendation by using an intelligent navigation algorithm, importing the reference data and the algorithmic recommendation into a back-end database, integrating the editor recommendation and the algorithmic recommendation in the back-end database, compiling the integrated database into the navigation dictionary, and importing the navigation dictionary into the intelligent navigation server.

In one embodiment, the user behavior log may be a search log, and the reference data may include keywords, search categories and search data. The storage calculation platform is used for generating the editor recommendation, which includes one or more index keywords, one or more index categories and the recommendation content, based on the reference data when the search data of the reference data is greater than a predetermined search threshold. An index keyword is a keyword of the reference data. An index category is a search category of the reference data. The recommendation content is the category and/or attribute corresponding to the search data of the reference data having the largest value.

In another embodiment, the user behavior log may be a clicking log, and the reference data may include keywords, search categories and clicking data. The storage calculation platform is used for generating the editor recommendation, which includes one or more index keywords, one or more index categories and the recommendation content, based on the reference data when the clicking data of the reference data is greater than a predetermined click threshold. An index keyword is a keyword of the reference data. An index category is a search category of the reference data. The recommendation content is the category and/or attribute corresponding to the clicking data of the reference data having the largest value.

In an alternative embodiment, the user behavior log may be a purchase log, and the reference data may include keywords, search categories and purchase data. The storage calculation platform is used for generating the editor recommendation, which includes one or more index keywords, one or more index categories and the recommendation content, based on the reference data when the purchase data of the reference data is greater than a predetermined purchase threshold. An index keyword is a keyword of the reference data. An index category is a search category of the reference data. The recommendation content is the category and/or attribute corresponding to the purchase data of the reference data having the largest value.

The editing device is used for editing based on the reference data in the back-end database to obtain the editor recommendation corresponding to the user behavior, and importing the editor recommendation into the back-end database.

The editing device may also be used for obtaining information relating to user feedback corresponding to the editor recommendation, and determining whether the editor recommendation is valid based on the user feedback. In the event that the editor recommendation is valid, the editor recommendation will be kept; otherwise, it will be modified.

The user feedback information includes the number of clicks corresponding to the editor recommendation and the number of clicks of each category of all the categories. In one embodiment, the editing device is used for determining that the editor recommendation is invalid when the number of clicks corresponding to the editor recommendation is smaller than the number of clicks of a certain category of all categories.

The present disclosure provides a number of advantages. As the recommendation results include the editor recommendation which is obtained based on information relating to the user behavior, the relevancy, richness and intelligence of the intelligent navigation may be enhanced. The negative effects on the recommendation algorithm caused by noise, lack of clicking information and misplacement of products under wrong categories may be minimized and, accordingly, the user shopping experience may be improved. As the recommendation data is provided by analyzing user behavior information and checking the number of products, coupled with the ability to track the effect of the edited navigation data, the accuracy, relevancy, richness and intelligence of the recommendation results are guaranteed. Accordingly, user search time decreases, and search loading on the servers is reduced. Of course, any product implementing an embodiment of the present disclosure needs not to possess all the aforementioned advantages at the same time.

Through the above-described preferred embodiments, persons of ordinary skill in the art can clearly understand that the present disclosure can be implemented in software in combination with necessary hardware platforms. Alternatively the present disclosure can be implemented in hardware as well, but in most cases software implementation may be better than hardware implementation. Based on such understanding, the technical features of the present disclosure in essence can be implemented in the form of a computer software application. The computer software application may be stored in one or more computer-readable storage media and includes certain computer-executable instructions which can make certain terminal equipment (e.g., a mobile phone, a personal computer, a server or a network device, etc.) to carry out the method described in the embodiments of the present disclosure.

The present disclosure provides only a number of preferred embodiments. It should be understood persons of ordinary skill in the art that certain modifications and improvements can be made and should be considered to be within the protection of the present disclosure without departing from the principles of the present disclosure.

Persons of ordinary skill in the art can understand that the modules of the apparatus in the embodiments can be distributed in the apparatus of the embodiments, or in one or more different apparatuses different from the present embodiments. The modules in the embodiments can be integrated or arranged separately, and they can be integrated as one module or can be further divided into multiple sub-modules. The serial numbers shown in the embodiments of the present disclosure are merely for description purpose and do not intend to indicate the merits and demerits of the embodiments.

What is claimed is:

1. A method implemented by one or more computers, the method comprising:
   obtaining user behavior information;
   providing a user behavior log based at least in part on the user behavior information;
   generating reference data based at least in part on statistics in the user behavior log;
   compiling the reference data to obtain an editor recommendation corresponding to the user behavior information; and
   compiling the editor recommendation into a navigation dictionary;
   receiving a user inquiry from a client terminal;
   searching the navigation dictionary based on the user inquiry;
   obtaining a recommendation result corresponding to the user inquiry, types of content of the recommendation result being obtained based on one or more types of contents included in the user inquiry, wherein:

the recommendation result comprising an index keyword, a recommendation type and recommendation content is obtained in an event that the content of the user inquiry comprises a search keyword, and the recommendation result comprising the index keyword, the recommendation content and an index category is obtained in an event that the content of the user inquiry comprises the search keyword and a search category, the index category being included in a category tree including distribution statistics of search categories; and sending the recommendation result to the client terminal.

2. The method as recited in claim 1, wherein searching the navigation dictionary comprises:

searching for a particular editor recommendation in the navigation dictionary based at least in part on the search keyword and the search category; and obtaining the recommendation content corresponding to the search keyword and the search category.

3. The method as recited in claim 1, wherein searching the navigation dictionary comprises:

searching for a particular editor recommendation in the navigation dictionary based at least in part on the search keyword; and obtaining the recommendation type and the recommendation content corresponding to the search keyword.

4. The method as recited in claim 3, wherein after sending the recommendation result to the client terminal, the method further comprises displaying the recommendation content on a user interface based on a format according to the recommendation type.

5. The method as recited in claim 1, wherein the user behavior log comprises a search log, and wherein the reference data comprises the search keyword, the search category, and search data.

6. The method as recited in claim 5, wherein compiling the reference data to obtain the editor recommendation corresponding to the user behavior information comprises:

when the search data of the reference data is greater than a predetermined search threshold, generating the editor recommendation which includes the index keyword, the index category, and the recommendation content based at least in part on the reference data, wherein the index keyword comprises the search keyword of the reference data, the index category comprises the search category of the reference data, and the recommendation content comprises at least one of: a category and an attribute corresponding to the search data having a greatest value in the reference data.

7. The method as recited in claim 1, wherein the user behavior log comprises a clicking log, and wherein the reference data comprises the search keyword, the search category, and clicking data.

8. The method as recited in claim 7, wherein compiling the reference data to obtain the editor recommendation corresponding to the user behavior information comprises:

when the clicking data of the reference data is greater than a predetermined clicking threshold, generating the editor recommendation which includes the index keyword, the index category, and the recommendation content based at least in part on the reference data, wherein the index keyword comprises the search keyword of the reference data, the index category comprises the search category of the reference data, and the recommendation content comprises at least one of: a category and an attribute corresponding to the clicking data having a greatest value in the reference data.

9. The method as recited in claim 1, wherein the user behavior log comprises a purchase log, and wherein the reference data comprises the search keyword, the search category, and purchase data.

10. The method as recited in claim 9, wherein compiling the reference data to obtain the editor recommendation corresponding to the user behavior information comprises:

when the purchase data of the reference data is greater than a predetermined purchase threshold, generating the editor recommendation which includes the index keyword, the index category, and the recommendation content based at least in part on the reference data, wherein the index keyword comprises the search keyword of the reference data, the index category comprises the search category of the reference data, and the recommendation content comprises at least one of: a category and an attribute corresponding to the purchase data having a greatest value in the reference data.

11. The method as recited in claim 1, wherein after compiling the reference data to obtain the editor recommendation corresponding to the user behavior information, the method further comprises:

obtaining user feedback information corresponding to the editor recommendation;

determining whether the editor recommendation is valid;

keeping the editor recommendation in response to determining that the editor recommendation is valid; and modifying the editor recommendation in response to determining that the editor recommendation is not valid.

12. The method as recited in claim 11, wherein the user feedback information comprises a number of clicks corresponding to the editor recommendation and a number of clicks of a given category, and wherein when the number of clicks corresponding to the editor recommendation is smaller than the number of clicks of the given category, the editor recommendation information is determined to be valid.

13. An intelligent navigation server comprising:

one or more processors;

memory;

an acquisition module stored in the memory and executable by the one or more processors that receives a user inquiry from a client terminal, the user inquiry comprising a search keyword;

an inquiry module stored in the memory and executable by the one or more processors that searches a navigation dictionary based at least in part on the user inquiry to obtain a recommendation result corresponding to the user inquiry, the navigation dictionary including an editor recommendation which is obtained based at least in part on user behavior, wherein:

the editor recommendation comprises a first category, a determination is made as to whether a number of clicks associated with a second category that correspond to the search keyword of the user inquiry but not included in the recommendation result is fraudulent data if the number of clicks associated with the second category is more than a number of clicks associated with the first category included in the editor recommendation, and the editor recommendation including the first category is deleted from the navigation dictionary in response to determining that the number of clicks associated with the second category is not fraudulent data; and a transmission module stored in the memory and executable by the one or more processors that sends the recommendation result to the client terminal.

14. An intelligent navigation system comprising:
one or more processors;
memory;
a webpage server stored in the memory and executable by the one or more processors to:
receive a user inquiry from a client terminal, the user inquiry comprising a search keyword and a search category,
send the user inquiry to an intelligent navigation server,
receive a recommendation result from the intelligent navigation server, the recommendation result comprising a category tree including distribution statistics of search categories, product categories and purchases corresponding to the search keyword, the statistics of purchases corresponding to the search keyword comprising one or more of a respective number of transactions and a respective monetary amount of the transactions that are associated with the search keyword in a search category of the search categories or a product category of the product categories, and
send the recommendation result to the client terminal;
a log server stored in the memory and executable by the one or more processors to:
obtain user behavior information from the webpage server,
generate a user behavior log based at least in part on the user behavior information;
a storage calculation platform stored in the memory and executable by the one or more processors to:
receive the user behavior log from the log server,
generate reference data based at least in part on statistics in the user behavior log,
compile the reference data to obtain an editor recommendation corresponding to the user behavior information, and
compile the editor recommendation into a navigation dictionary.

15. The system as recited in claim 14, further comprising:
an editing device stored in the memory and executable by the one or more processors to:
edit the reference data,
obtain the editor recommendation corresponding to the user behavior information, and
import the editor recommendation into a back-end database.

16. The system as recited in claim 15, wherein the editing device is further configured to provide a reminder to a user to review a recommendation content corresponding to a time-sensitive keyword.

* * * * *